United States Patent [19]

Talasz

[11] Patent Number: 4,483,370
[45] Date of Patent: Nov. 20, 1984

[54] RESTRICTOR COLLAR FOR INSTALLATION IN THE LEAKAGE WATER DISCHARGE PIPES OF TURBINES AND PUMPS

[75] Inventor: Johann Talasz, Heidenheim, Fed. Rep. of Germany

[73] Assignee: J. M. Voith, GmbH, Heidenheim, Fed. Rep. of Germany

[21] Appl. No.: 462,389

[22] Filed: Jan. 31, 1983

[30] Foreign Application Priority Data

Feb. 12, 1982 [DE] Fed. Rep. of Germany ....... 3204937

[51] Int. Cl.³ .............................................. F15D 1/00
[52] U.S. Cl. ..................................................... 138/45
[58] Field of Search .................... 138/45, 46; 251/340, 251/208

[56] References Cited

U.S. PATENT DOCUMENTS

| | | | |
|---|---|---|---|
| 1,623,056 | 4/1927 | Kenan | 138/46 |
| 2,612,747 | 10/1952 | Skinner | 138/45 |
| 2,709,566 | 5/1955 | Davis | 251/340 |
| 2,891,579 | 6/1959 | Burkland et al. | 138/45 |
| 2,909,197 | 10/1959 | Liley | 138/45 |
| 3,106,225 | 10/1963 | Spurling | 138/45 |
| 3,812,882 | 5/1974 | Taylor | 251/208 |
| 4,261,376 | 4/1981 | Kingsford | 138/45 |
| 4,298,470 | 11/1981 | Stallings | 138/45 |

FOREIGN PATENT DOCUMENTS

| | | | |
|---|---|---|---|
| 477771 | 10/1951 | Canada | 138/45 |
| 62746 | 7/1968 | Fed. Rep. of Germany . | |
| 370965 | 2/1907 | France . | |
| 691813 | 10/1980 | France . | |
| 21635 | of 1907 | United Kingdom | 251/208 |
| 2070738 | 9/1981 | United Kingdom . | |

*Primary Examiner*—John W. Shepperd
*Attorney, Agent, or Firm*—Albert L. Jeffers; Douglas L. Miller

[57] ABSTRACT

A restrictor collar for installation in the leakage water discharge pipes of Francis and pump turbines as well as pumps, which is simple in construction, is easily adjustable in the cross section thereof, and has increased security against unintentional changes of the setting thereof. Two orifice plates or disks are coaxially disposed in the pipe at a separation point therein, and each plate has an eccentrically disposed opening therein. One of the plates is fixed in position, and the other is rotatable relative thereto and in abutting engagement thereagainst. The openings are preferably circular in shape and at least partially overlap one with the other. The rotating disk, which is pressed against the fixed disk by means of a releasable flange, has insert holes radially disposed in the periphery thereof.

1 Claim, 2 Drawing Figures

RESTRICTOR COLLAR FOR INSTALLATION IN THE LEAKAGE WATER DISCHARGE PIPES OF TURBINES AND PUMPS

In hydraulic machines, such as turbines and pumps, there are arranged leakage water discharge pipes provided with a shut-off valve between the machine cover and the suction pipe for the purpose of draining off the leakage water appearing between the runner crown and the cover. A machine representative of this is disclosed in East German Pat. No. 62,746. The leakage water causes a bending or bulging of the machine cover and causes a stress on the mechanical seal between the runner shaft and the cover. Moreover, the pressure caused by the leakage water may also overload the thrust bearing of the machine. Since the leakage water pressure exerts influence on the axial thrust of the machine runner, a flow restrictor plate has already been installed for a well-defined setting of the pressure in the leakage water discharge pipe. However, as the pressure conditions in the leakage water discharge pipe change with extended use of the hydraulic mechanism because of the leakage or overflow water, it is necessary to replace the existing throttle with one having a corrected clear cross section. Due to the required drainage of the hydraulic machine, such a requirement is quite costly in time and expense. For this reason, adjustable valves were installed in the leakage water discharge pipe in order to be able to correct the water pressure in the pipe at any time. Aside from the fact that such shut-off or controlling valves are expensive, the potential exists that they will be accidentally set wrong or closed completely, thereby possibly causing damage, for example, to the thrust bearing.

French Pat. No. 691,813 discloses a restrictor collar having a fixed crosswall or partition with an opening arranged eccentrically therein. Against this fixed cross wall or partition there rests a movable crosswall or partition having an opening also eccentrically disposed therein. This arrangement provides an outlet cross section variable between a maximum outlet cross section and a completely shutoff cross section.

An object of the present invention is to provide in the leakage water discharge pipe a restrictor collar of simple construction, which provides easy adjustment under changing pressure conditions.

Since the restrictor collar of the present invention comprises two structural parts, it is characterized by particularly simple construction, economy-priced production, and virtual insusceptibility to failure. The water pressure in the leakage water discharge pipe is capable of easy and accurate adjustment without extended intermission of the hydrualic mechanism, the clear cross section of the orifice plate being adjustable between a minimum and maximum value. A complete closure of the orifice plate is precluded. Based on a very wide adjustment range, the restrictor collar of the present invention meets a wide variety of requirements.

BRIEF DESCRIPTION OF THE DRAWINGS

The above-mentioned and other features and objects of this invention, and the manner of attaining them, will become more apparent, and the invention itself will be better understood by reference to the following description of an embodiment of the invention taken in conjunction with the accompanying drawing, wherein.

DESCRIPTION OF A PREFERRED EMBODIMENT

Figure 1:
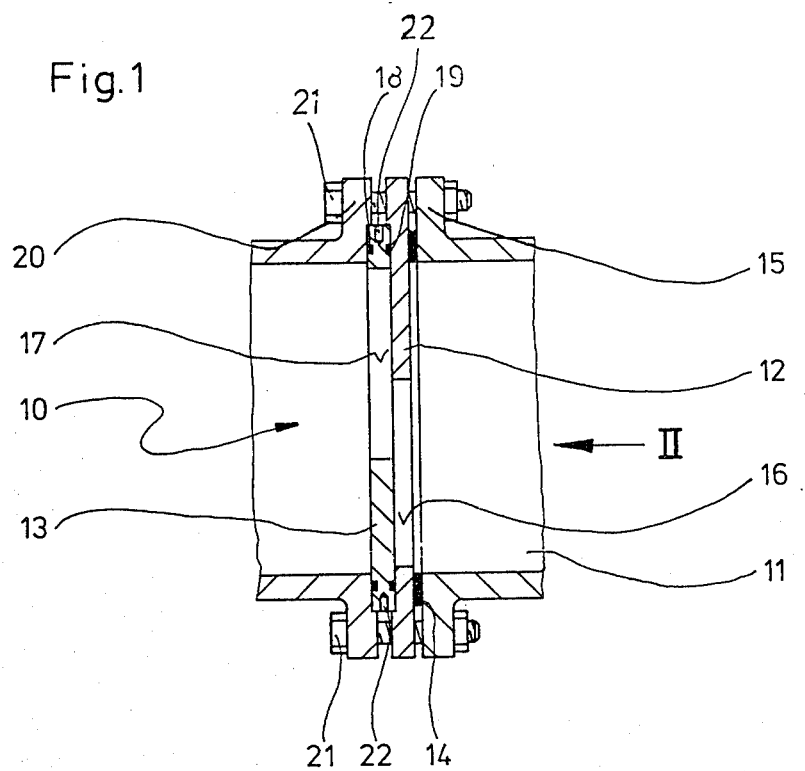
FIG. 1 is a cross sectional view of a preferred embodiment of the present invention.

Referring to the figures, restrictor collar 10 is installed in leakage water discharge pipe 11 of a Francis or pump turbine (not shown). Restrictor collar 10 is arranged at a separation point of pipe 11 and has two circular disks 12 and 13. Disk 12 rests in fixed position against flange 15 of leakage water discharge pipe 11 with interposition of flat seal 14, and is provided with an eccentrically disposed circular opening 16 therein. Blending disk 13 resting against fixed disk 12 likewise has circular opening 17 eccentrically disposed therein. Openings 16 and 17 are easily made because of their circular shape. Disk 13 has a smaller diameter than disk 12 and is clamped between flange 20 of pipe 11 and disk 12. Circular seal rings 18, 19 are disposed against respective sides of disk 13.

Figure 2:
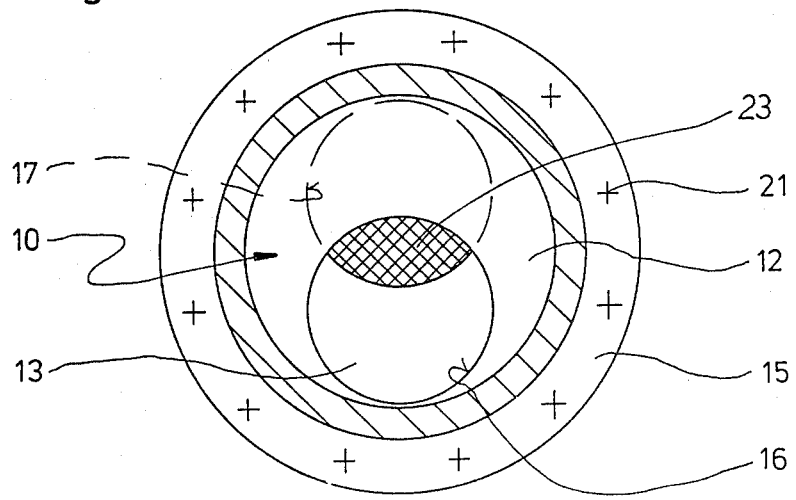
FIG. 2 is an elevational view of the embodiment in FIG. 1 viewed in the direction of the arrow II.

With disks 12 and 13 positioned as represented in FIG. 2, their two openings 16 and 17 show only a minimal overlapping. The crosshatched clear cross section 23 of restrictor collar 10 therefore causes a strong throttling of the leakage water flowing through pipe 11. For the purpose of changing cross section 23, disk 13 may be rotated relative to disk 12. This is easily accomplished by slightly loosening screws 21 which connect flanges 15 and 20 together. With a tool (not shown), disk 13 is rotated until the desired cross section 23 is obtained. Rotation of disk 13 is accomplished by inserting the tool in blind holes 22 radially extending on the circumference of disk 13. After adjusting restrictor collar 10, the rotatable disk 13 is secured by tightening screws 21 between the fixed disk 12 and the associated flange 20.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. In an adjustable restrictor collar for installation in a separation point of leakage water discharge pipe of Francis and pump turbines as well as pumps, with two coaxially arranged disks, each having one eccentrically disposed opening therein, one of said disks being fixed against movement and the other said disk being substantially circular, the improvement comprising:

said two disks having their mutually facing planar surfaces in abutment against each other, and being securable against rotation relative to each other between two adjustably securable flange members at said separation point of said discharge pipe, said one disk and said flange member adjacent said other disk being spaced-apart to expose portions of the circumferential surface of said other disks, said openings being substantially circular in shape and at least partially overlapping one with the other, and said other disk having a plurality of radially disposed holes in said portions of said circumferential surface, said other disk being rotatable relative to said one disk when said flange members are adjustably loosened, whereby said other disk is adapted to be rotated by inserting an adjustment tool in one of said holes when said flange members are adjustably loosened, and then secured against rotation when said flange members are resecured.

* * * * *